(12) United States Patent
N

(10) Patent No.: US 8,935,784 B1
(45) Date of Patent: Jan. 13, 2015

(54) PROTECTING SUBSCRIBERS OF WEB FEEDS FROM MALWARE ATTACKS

(71) Applicant: Symantec Corporation, Mountain View, CA (US)

(72) Inventor: Srinath N, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/839,603

(22) Filed: Mar. 15, 2013

(51) Int. Cl.
*G06F 21/00* (2013.01)
*G06F 21/56* (2013.01)

(52) U.S. Cl.
CPC ..................................... *G06F 21/56* (2013.01)
USPC .............................................. 726/22; 726/24

(58) Field of Classification Search
CPC ..... G06F 21/55; G06F 21/554; G06F 21/561; G06F 21/562; G06F 21/577
USPC ........................... 726/22, 24, 25, 23; 713/188
See application file for complete search history.

(56) References Cited

U.S. PATENT DOCUMENTS

| 8,584,233 | B1 * | 11/2013 | Yang et al. | 726/22 |
| 2010/0017880 | A1 * | 1/2010 | Masood | 726/24 |

* cited by examiner

Primary Examiner — Edward Zee
(74) Attorney, Agent, or Firm — Brill Law Office; Jeffrey Brill

(57) ABSTRACT

Subscribers to web feeds are protected from malware attacks. User web feed activity is monitored, attempts by the user to subscribe to web feeds are detected, and identifiers of web feeds to which the user attempts to subscribe are captured. Links in these web feeds are identified, and it is determined whether identified links in web feeds are safe to access. Web feeds are displayed to the user only in response to determining that all links identified therein are safe. User attempts to obtain new content from displayed web feeds are detected, and links in the new content are identified. It is determined whether identified links in new content are safe. New content that contains only safe links is displayed to the user, whereas new content containing at least one suspicious link is blocked.

16 Claims, 7 Drawing Sheets

PROTECTING SUBSCRIBERS OF WEB FEEDS FROM MALWARE ATTACKS

TECHNICAL FIELD

This disclosure pertains generally to computer security, and more specifically to protecting subscribers of web feeds from malware attacks.

BACKGROUND

RSS ("Rich Site Summary") feeds are widely used to automatically receive and view current content from favorite websites, either in conjunction with a browser on a desktop or laptop computer, or using a hand held computing device such as a smartphone or tablet. RSS is a web feed format used to publish frequently updated content, such as news, blogs, postings of digital photographs and videos, etc. A site can use RSS to publish a new digital content item once, allowing all users that subscribe to the given feed to receive and view the published content automatically.

RSS feeds can be read using software typically called an RSS reader, which can be implemented in the form of a browser add-on, embedded within an application such as a personal information manager (for example, Microsoft Outlook® or a similar package from another vendor), or be instantiated as a standalone application running on a desktop computer, a mobile computing device or in the cloud. A user subscribes to a feed by providing its identifier to the RSS reader. This process can be automated for the user, for example by prompting the user to click on a feed icon. The RSS reader checks the feeds the user has subscribed to on a regular basis for new content, based on the refresh schedule of the given feeds, which can be default or user specified. Any new content is downloaded to the user's computing device and displayed to the user. RSS thus allows users to avoid manually checking websites they frequently access. Instead, the user can subscribe to the feeds for the sites of interest, such that all new content is automatically retrieved and provided to the user. Although RSS is currently the most widely used web feed format, other formats are also used in this capacity, such as Atom.

Given the proliferation of frequently updated websites and blogs, people increasingly track their favorite sites via web feeds. As handheld computing devices are becoming widely used, over 60% of tablet and smartphone users subscribe to news feeds on these devices, and this percentage can be expected to increase. Although extremely useful for automatically tracking current updates, web feeds are unfortunately becoming a favorite attack vector for malware. Web feeds such as RSS provide web based content to users, and as such are vulnerable to attacks that are executed by providing links to sites hosting malware. In other words, the web content obtained via a web feed can be compromised to contain links that when clicked lead to sites hosting malicious code, such as scripting attacks, drive-by downloads, phishing attacks, etc. In some cases, even viewing a malicious link can infect a user's computer, for example in the case of cross-site scripting. Past attacks have been detected in which RSS vulnerabilities have been exploited to infect the computer systems of users in these ways.

It would be desirable to address this issue.

SUMMARY

Subscribers of web feeds are protected from malware attacks. Identifiers of web feeds from which a user indicates an interest in obtaining content are gleaned. This can take the form of monitoring the user's web feed activity, detecting attempts by the user to subscribe to web feeds, and capturing identifiers of web feeds to which the user attempts to subscribe. In addition or instead, the user can enter identifiers of web feeds of interest. Links in web feeds corresponding to gleaned identifiers are identified, for example by examining channel elements of the web feeds to detect links. It is determined whether identified links in web feeds are safe for the user to access, for example by obtaining link safety ratings from a remote, centralized security source. Web feeds are displayed to the user only in response to determining that all links identified in a given web feed are safe for the user to access.

Attempts by the user to obtain new content from displayed web feeds are detected, and links in new content from displayed web feeds are identified, for example by examining item elements of web feeds to detect links. It is determined whether identified links in new content from displayed web feeds are safe for the user to access. New content that contains only safe links is displayed to the user, whereas new content containing at least one suspicious link is blocked.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
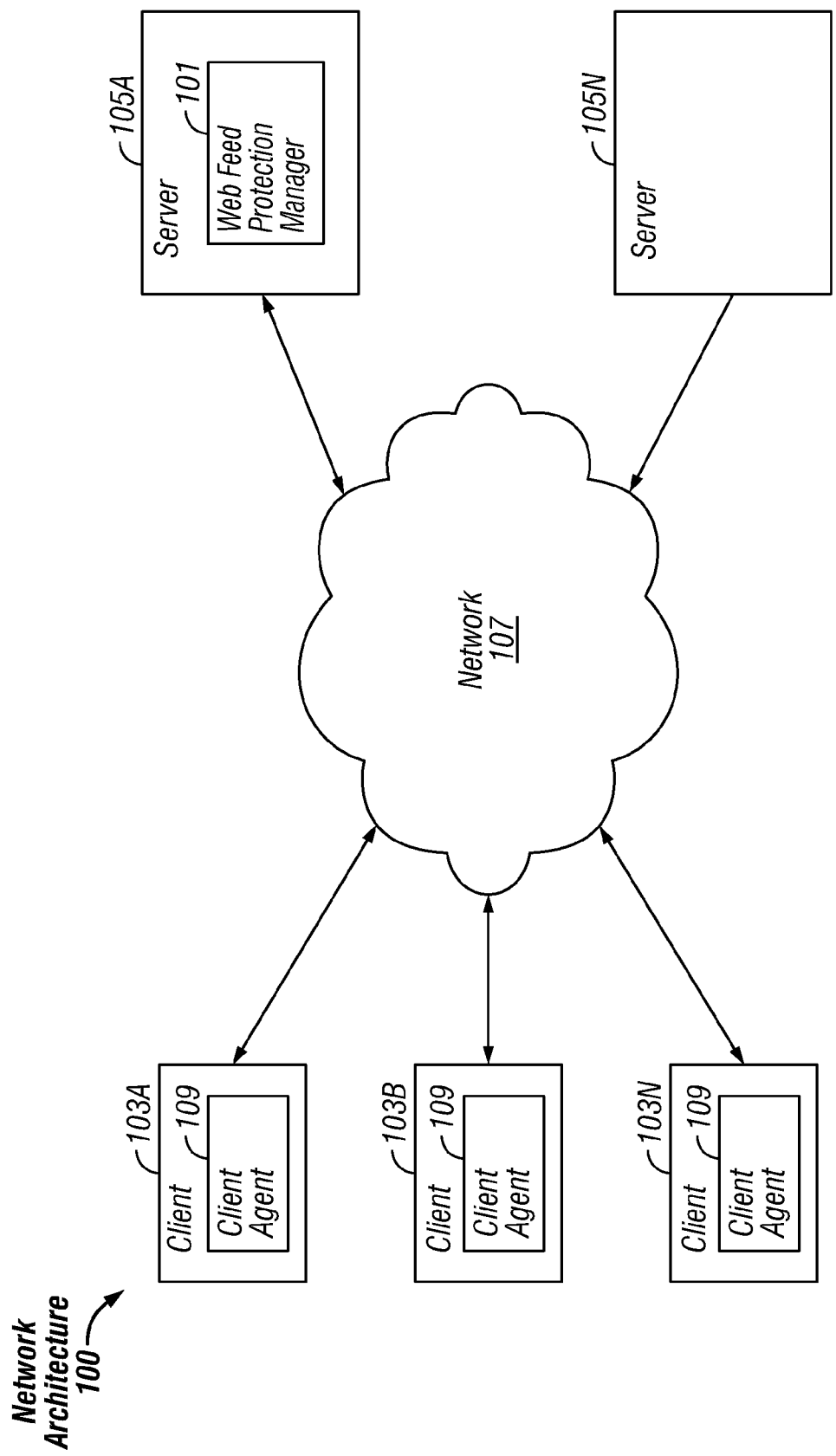
FIG. 1 is a block diagram of an exemplary network architecture in which a web feed protection manager can be implemented, according to some embodiments.

FIG. 1 is a block diagram illustrating an exemplary network architecture 100 in which a web feed protection manager 101 can be implemented. The illustrated network architecture 100 comprises multiple clients 103A, 103B and 103N, as well as multiple servers 105A and 105N. In FIG. 1, the web feed protection manager 101 is illustrated as residing on server 105A, with a client agent 109 running on each client 103A-C. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Such mobile computing devices are sometimes referred to as smartphones, although many mobile phones not so designated also have these capabilities. Tablet and laptop computers are other examples of mobile computing devices.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
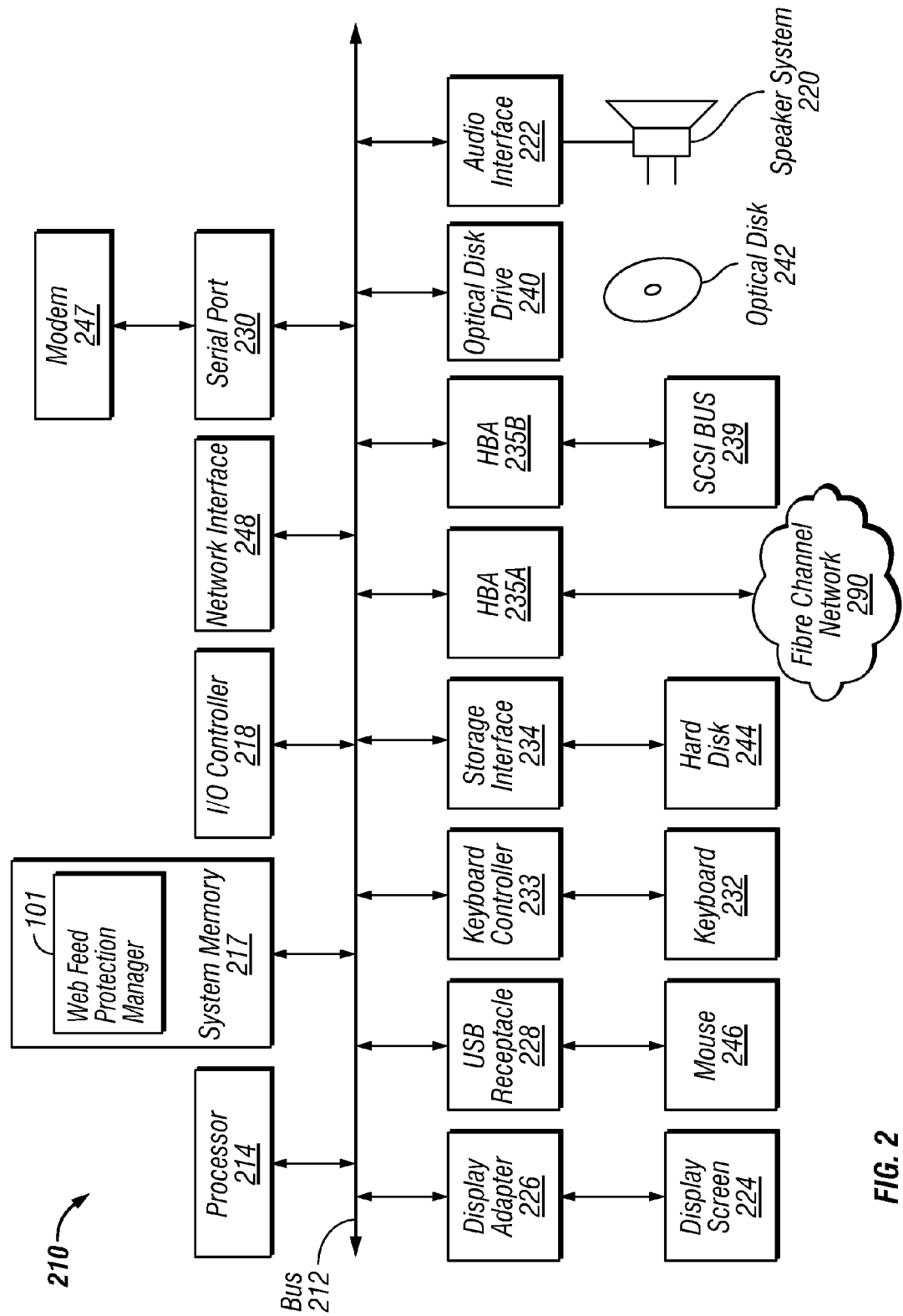
FIG. 2 is a block diagram of a computer system suitable for implementing a web feed protection manager, according to some embodiments.

FIG. 2 is a block diagram of a computer system 210 suitable for implementing a web feed protection manager 101. Both clients 103 and servers 105 can be implemented in the form of such computer systems 210. A computer system 210 of the type illustrated in FIG. 2 can but need not be in the form of a mobile computing device. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/ or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the web feed protection manager 101 is illustrated as residing in system memory 217. The workings of the web feed protection manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
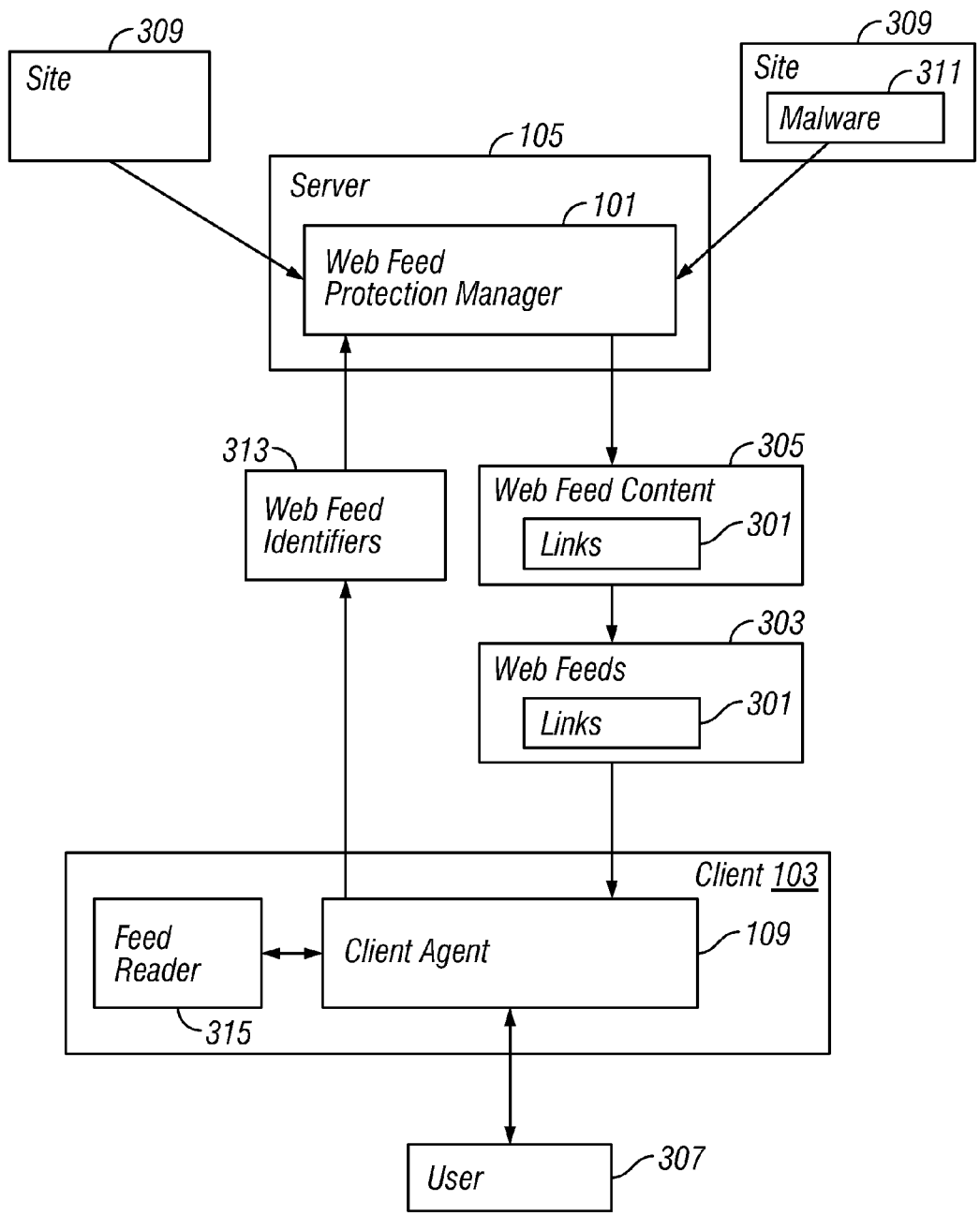
FIG. 3 is a block diagram of the operation of a web feed protection manager, according to some embodiments.
Figure 4:
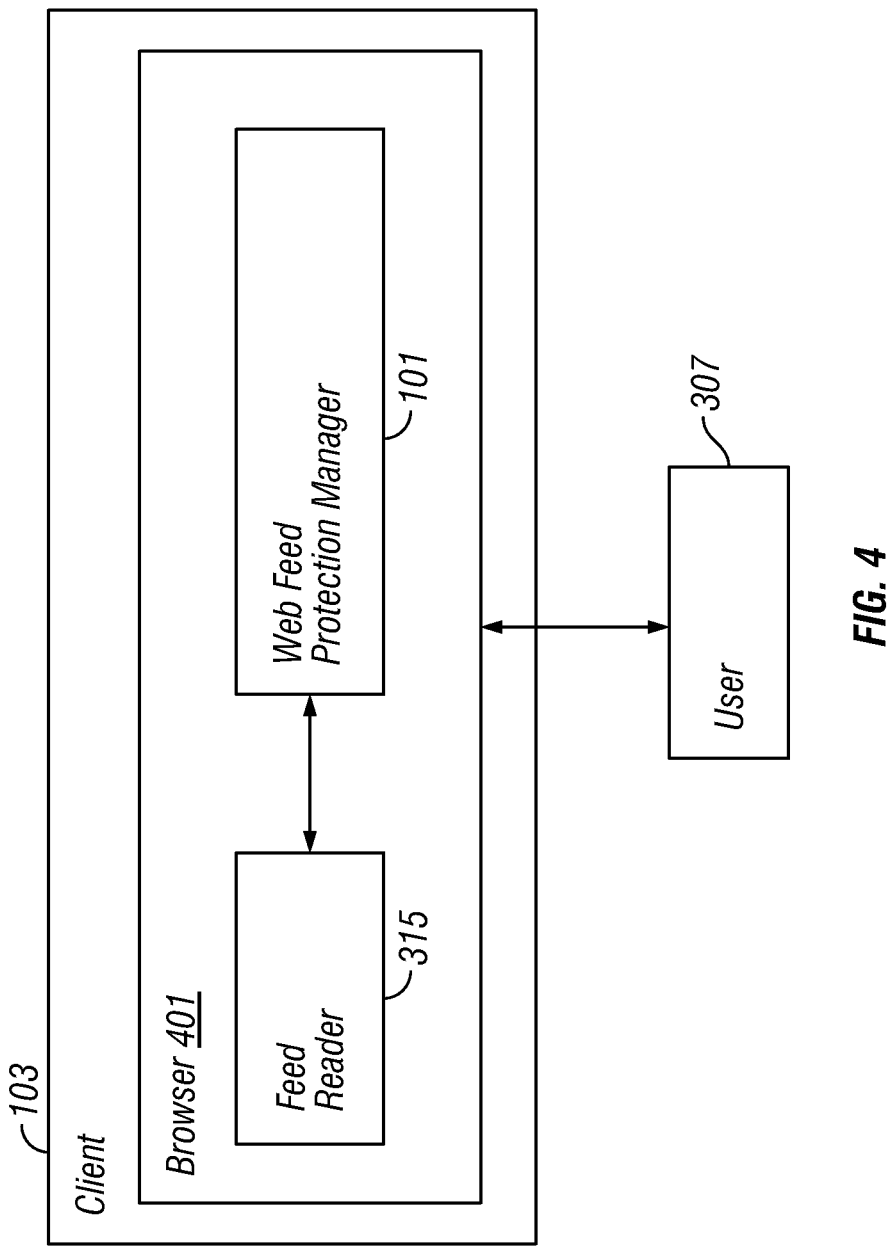
FIG. 4 is a block diagram of the operation of a web feed protection manager, according to other embodiments.
Figure 5:
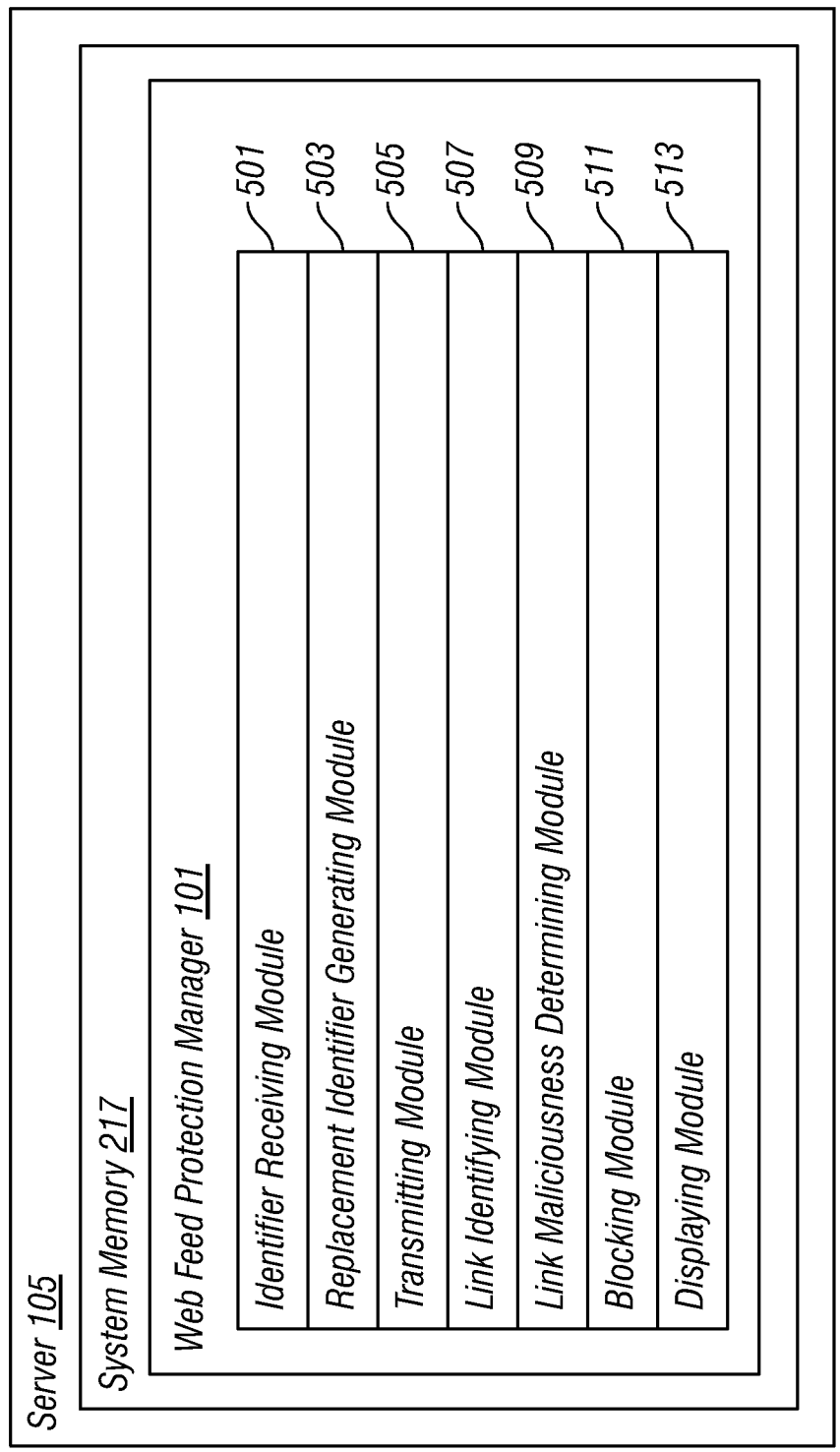
FIG. 5 is a block diagram of specific modules of a server-side web feed protection manager 101 according to some embodiments.

FIGS. 3 and 5 illustrates a web feed protection manager 101 running in the system memory 217 of a server 105, whereas 4 and 7 illustrates a web feed protection manager 101 running in the system memory 217 of a client 103. As described above, the functionalities of the web feed protection manager 101 can reside on a server 105, a client 103 (including but not limited to a client 103 in the form of a mobile computing device), or be distributed between multiple computer systems 210, including within a cloud-based computing environment in which the functionality of the web feed protection manager 101 is provided as a service over a network 107. It is to be understood that although the web feed protection manager 101 is illustrated in FIGS. 3-7 as a single entity, the illustrated web feed protection manager 101 represents a collection of functionalities, which can be instantiated as a single or multiple modules on one or more computing devices 210 as desired. FIGS. 3-7 illustrate specific embodiments in which the web feed protection manager 101 is instantiated in the form of specific, multiple modules. In other embodiments, the functionalities of the web feed protection manager 101 are distributed and/or instantiated in other ways. It is to be understood that the modules of the web feed protection manager 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the web feed protection manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the web feed protection manager 101 leverages the format of RSS or other web feed standards to check all links 301 in the initial feed 303 and in all new content 305 received via the feed 303, before making them available to the user 307. If a given link 301 is adjudicated to be safe, it is displayed to the user 307. However, if a link 301 is suspicious, the link 301 is not provided to the user 307, and thus the user 307 is prevented from clicking on links 301 to websites 309 that host malicious code 311. By checking links 301 in content 305 from all web feeds 303 subscribed to by the user 307, the user 307 is protected from malware attacks that exploit web feeds 303. Given the large and increasing number of users 307 who subscribe to web feeds 303, it is paramount that these subscribers be protected against the incidence of malware attacks to which the feeds 303 are susceptible.

FIG. 3 illustrates an embodiment in which the web feed protection manager 101 runs on a server 105 accessible by multiple users 307. Each user 307 operates a separate client computer 103, and the clients 103 can be at various physical locations. In other words, in the embodiment of FIG. 3 the web feed protection manager 101 is in the cloud, and its functionality can be accessed as a service over a network 107 (e.g., the Internet). Although FIG. 3 illustrates only a single client-based user 307, it is to be understood that many separate client-based users 307 can interact with a cloud-based web feed protection manager 101 over a network 107.

As illustrated in FIG. 3, a client agent 109 of the web feed protection manager 101 runs on a client 103. The client agent 109 transmits an identifier 313 of each web feed 303 (e.g., each RSS feed) to which the user 307 subscribes to the web feed protection manager 101 on the server 105. The client agent 109 can glean this information in different ways in different embodiments. In one embodiment, the client agent 109 is instantiated as an add-on (e.g., a plug-in, a helper object, or the like) that works in conjunction with the feed reader 315 in the user's browser 401 (a browser 401 is not separately illustrated in FIG. 3 but is illustrated in FIG. 4). The client agent 109 can instead be instantiated to work in conjunction with non-browser based feed readers 315, such as a feed reader 315 embedded in Microsoft Outlook® or a similar package from another vendor, or to work in concert with a standalone feed reader 315. In these embodiment, the client agent 109 monitors web feed activity (e.g., the activity of the feed reader 315), and detects attempts by the user 307 to subscribe to web feeds 303 through the feed reader 315. When such an attempt is detected, the client agent 109 captures the identifier 313 of the web feed 303 to which the user 307 is attempting to subscribe.

In another embodiment, instead of or in addition to capturing identifiers 313 of web feeds 303 to which the user 307 attempts to subscribe, the user 307 identifies web feeds 303 of interest to the client agent 109, either in response to being prompted, for example via a user interface, or through a configuration file, command line, environment variable, etc. In another embodiment, there is no client agent 109, and the user 307 provides this information directly to the web feed protection manager 101 running on the server 105, for example through a web page based interface. The specific format of an identifier 313 can vary depending upon the format of the web feeds 303 in question. For example, an identifier of a web feed 303 can be in the form of a Uniform Resource Locator (URL), a Uniform Resource Identifier (URI), a numeric identifier, etc.

The web feed protection manager 101 on the server 105 receives the identifiers 313 of user subscribed web feeds 303. The server-side web feed protection manager 101 processes each received identifier 313 to check for links 301 to sites 309 containing malware 311, as described in detail below. The server-side web feed protection manager 101 generates a replacement identifier $313_{replacement}$ to be used on the client-side to access the web feed 303. This replacement identifier $313_{replacement}$ is transmitted to the client agent 109. The client agent 109 then continues to monitor the client-side feed reader 315, and substitutes the replacement identifier $313_{replacement}$ for the actual identifier 313 of the target web feed 303 when the client-side feed reader 315 attempts to access the web feed 303. The replacement identifier $313_{replacement}$ points back to the server-side web feed protection manager 101, and identifies the web feed 303 the feed reader 315 is attempting to access. For example, the replacement identifier $313_{replacement}$ can be in the form of a URL of the server-side web feed protection manager 101, and can contain the target web feed 303 as a parameter. Thus, attempts by the feed reader 315 to obtain updates from the web feed 303 using the replacement identifier $313_{replacement}$ are directed to and invoke the web feed protection manager 101 on the server 105, which obtains the updated content 305 and checks it for links 301 to malicious sites 309, as described in detail below.

FIG. 4 illustrates other embodiments in which a web feed protection manager 101 resides on a client 103. In FIG. 4, the web feed protection manager 101 is illustrated as being implemented in the form of an add-on (e.g., a plug-in, a helper object, etc.) to the user's browser 401. In such an embodiment, the browser 401 contains a feed reader 315, which is also typically implemented as a browser add-on. The web feed protection manager 101 monitors the user's web feed activities (e.g., the activity of the feed reader 315), detects attempts by the user 307 to subscribe to web feeds 303, and captures the target identifiers 313. Instead or in addition, identifiers 313 of web feeds 303 of interest can be gleaned in other ways. For example, the user 307 can identify web feeds 303 of interest to the client-side web feed protection manager 101 directly, for example through a user interface, configuration file, command line, etc. This functionality is described as being performed by the client agent 103 in the server-side web feed protection manager 101 based embodiments of FIG. 3. In the embodiments of FIG. 4, rather than transmitting the obtained identifiers 313 to the cloud for processing, the client-side web feed protection manager 101 processes each target identifier 313 to check for links 301 to sites 309 containing malware 311, as described in detail below.

The client-side web feed protection manager 101 also detects attempts by the feed reader 315 to obtain updates from any web feed 303, and again captures the corresponding identifiers 313. The client-side web feed protection manager 101 uses the functionality described in detail below to securely obtain the updated content 305, and check it for links 301 to malicious sites 309. In other embodiments, the client-side web feed protection manager 101 works in conjunction with feed readers 315 other than or in addition to those instantiated in the browser 401, including standalone feed readers 315 and/or those embedded in applications other than browsers 401.

Whether based on a server 105 or on a client 103, the web feed protection manager 101 leverages the specification of a given web feed format (such as RSS) in order to check web feeds 303 and new content 305 received thereon for links 301 to websites 309 that host malicious code 311. More specifically, each RSS feed 303 adheres to the RSS standard specification, which specifies that an RSS feed 303 has one <channel> element containing metadata information regarding the website offering the RSS feed 303. A <channel> element contains the mandatory fields Title, Link and Description, as well as multiple <item> elements. Each <item> element is an individual item of content 305 (e.g., a news item) that is downloaded and displayed by the feed reader 315. Similar to the <channel> element, each <item> element also has Title, Link and Description fields. It is to be understood that the exact naming and markup indicators of the elements and fields described herein could change in future versions of RSS, and can vary in other web feed formats. In some embodiments, the web feed protection manager 101 applies the functionality described below using elements and fields having different names but equivalent architecture.

As described above, the web feed protection manager 101 detects attempts by users 307 to subscribe to new feeds 303 by identifier 313. When a user 307 initially attempts to subscribe to a web feed 303 (or otherwise expresses interest in a new web feed 303), the web feed protection manager 101 examines the <channel> element of the web feed 303. More specifically, the web feed protection manager 101 identifies any links 301 that are present in the fields of the <channel> element that can contain links 301, such as the Title, Link and Description fields. The web feed protection manager 101 checks any identified links 301 to determine whether the links 301 are safe for the user 307 to access. The web feed protection manager 101 can use conventional functionality to check potential maliciousness of the links 301, for example by obtaining an established safety rating (e.g., known safe, untested, warning, caution, etc.) for each link 301 from a remote, centralized security source (e.g., a database or a security application, such as Norton SafeWeb®). If any of the links 301 in the <channel> elements for a given web feed 303 are determined to be suspicious, the web feed protection manager 101 can block the web feed 303 outright, or warn the user 307 as described in more detail below. On the other hand, if all of the links 301 in the channel element for a given web feed 303 are determined to be safe, the web feed 303 is displayed to the user 307 by the feed reader 315. The web feed protection manager 101 then checks the safety of any links 301 in incoming content 305 on the web feed 303, as described below.

As described above, the web feed protection manager 101 detects attempts by the feed reader 315 to obtain new content 305 (updates) from web feeds 303. New content 305 on a web feed 303 is in the form of one or more incoming <item> elements. Whenever new content 305 is obtained from a web feed 303 to which a protected user 307 subscribes, the web feed protection manager 101 identifies any links 301 in the fields of each incoming <item> element that can contain links 301 (e.g., the <item> element's Title, Link and Description fields). The web feed protection manager 101 checks any identified links 301 for potential maliciousness as described above (e.g., by extracting identified links 301 and submitting them to a centralized security application such as Norton SafeWeb® to obtain safety ratings). The web feed protection manager 101 allows the display of safe new content 305 from web feeds 303, and blocks or otherwise protects the user from new content 305 with suspicious links 301.

Thus, web feeds 303 that are determined to contain only safe links 301 are displayed to the user 307, as are new content items 305 that are determined to be free from suspicious links 301. In one embodiment, when a specific web feed (e.g., a <channel>) or item of incoming new content 305 (e.g., an <item>) is determined to contain one or more suspicious links 301, the web feed protection manager 101 blocks the feed 303 and/or new content 305 from being displayed to the user 307. Other actions can be taken instead of or in addition to blocking, such as displaying the item with the links removed (e.g., replaced with a non-active description of the removed link), displaying a warning to the user 307 concerning the suspicious link(s) 301 (with or without an option for the user 307 to override the displayed warning), launching any suspicious links 301 in a browser 401 that is sandboxed from the computer system's resources, etc. In different embodiments, different levels of granularity can be applied to safety ratings of links 301 (e.g., known safe, untested, caution, warning, highly suspect, known malicious, etc.), and different default actions can be taken in response to links 301 with varying ratings (e.g., block anything other than known safe, warn for untested, etc.).

By blocking or otherwise protecting users 307 from web feeds 303 and feed originated content 305 containing suspicious links 301, the web feed protection manager 101 prevents users 307 from clicking or even viewing links 301 to websites 309 hosting malware 311. Thus, the users 307 are protected from any malware 311 present on the target sites 309 that can be activated by clicking or viewing the links 301, such as scripting attacks, cross site scripting (XSS) holes, phishing attacks, drive-by downloads, etc.

FIG. 5 illustrates specific modules of a web feed protection manager 101 residing in the system memory 217 of a server computer 105, according to some embodiments. An identifier receiving module 501 can receive identifiers 313 of user subscribed web feeds 303, as well as the identifiers 313 of web feeds otherwise flagged as being of interest to users 307. A replacement identifier generating module 503 generates replacement identifiers $313_{replacement}$ to be used by clients 103 to safely access web feeds 303 through the server-side web feed protection manager 101. A transmitting module 505 can transmit replacement identifiers $313_{replacement}$ web feeds 303 and web feed originated content 305 to clients 103. A link identifying module 507 identifies links 301 in web feeds 303 and web feed content 305. A link maliciousness determining module 509 determines whether identified links 301 are potentially malicious. A blocking module 511 can block web feeds 303 and content 305 determined to contain suspicious links 301, whereas a displaying module 513 can display web feeds 303 and content 305 adjudicated to contain only safe links 301.

Figure 6:
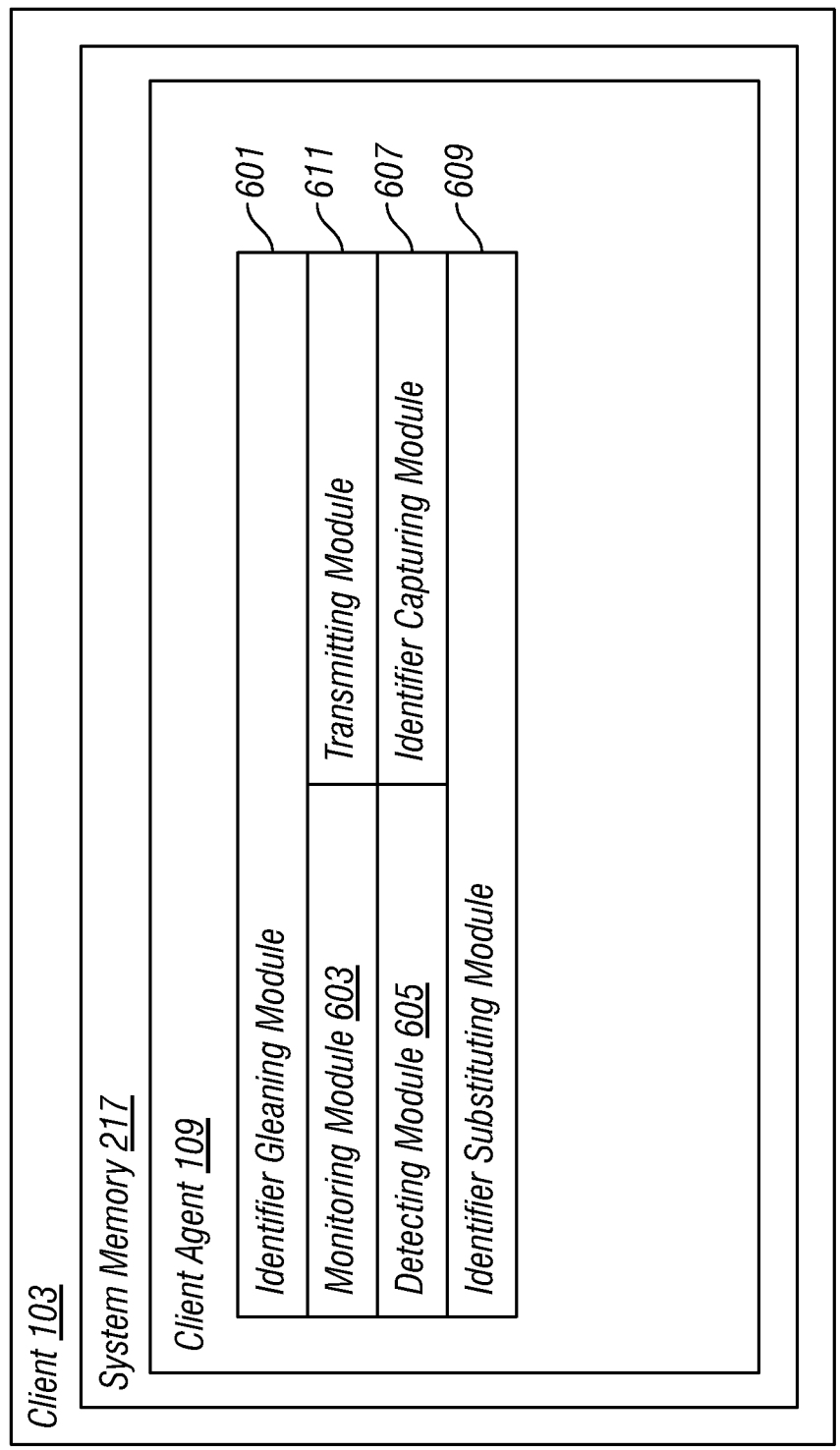
FIG. 6 is a block diagram of specific modules of a client agent that works in conjunction with a server-side web feed protection manager 101 according to some embodiments.

FIG. 6 illustrates specific modules of a client agent 109 residing in the system memory 217 of a client computer 103 according to some embodiments. As described above, the client 109 works in conjunction with a server-side web feed protection manager 101. An identifier gleaning module 601 gleans identifiers 313 of web feeds 303 to which a user 307 attempts to subscribe or otherwise flags as being of interest. A transmitting module 611 transmits gleaned identifiers 313 to the server-side web feed protection manager 101. A monitoring module 603 can monitor web feed activity, such as the activity of a feed reader 315. A detecting module 605 detects attempts to subscribe to web feeds 303 and to obtain new web feed originated content 305. An identifier capturing module 607 can capture identifiers 313 of web feeds 303 targeted in monitored activities. An identifier substituting module 609 substitutes replacement identifiers $313_{replacement}$ for actual identifiers 313 of target web feeds 303, in response to monitored attempts to access new content 305.

Figure 7:
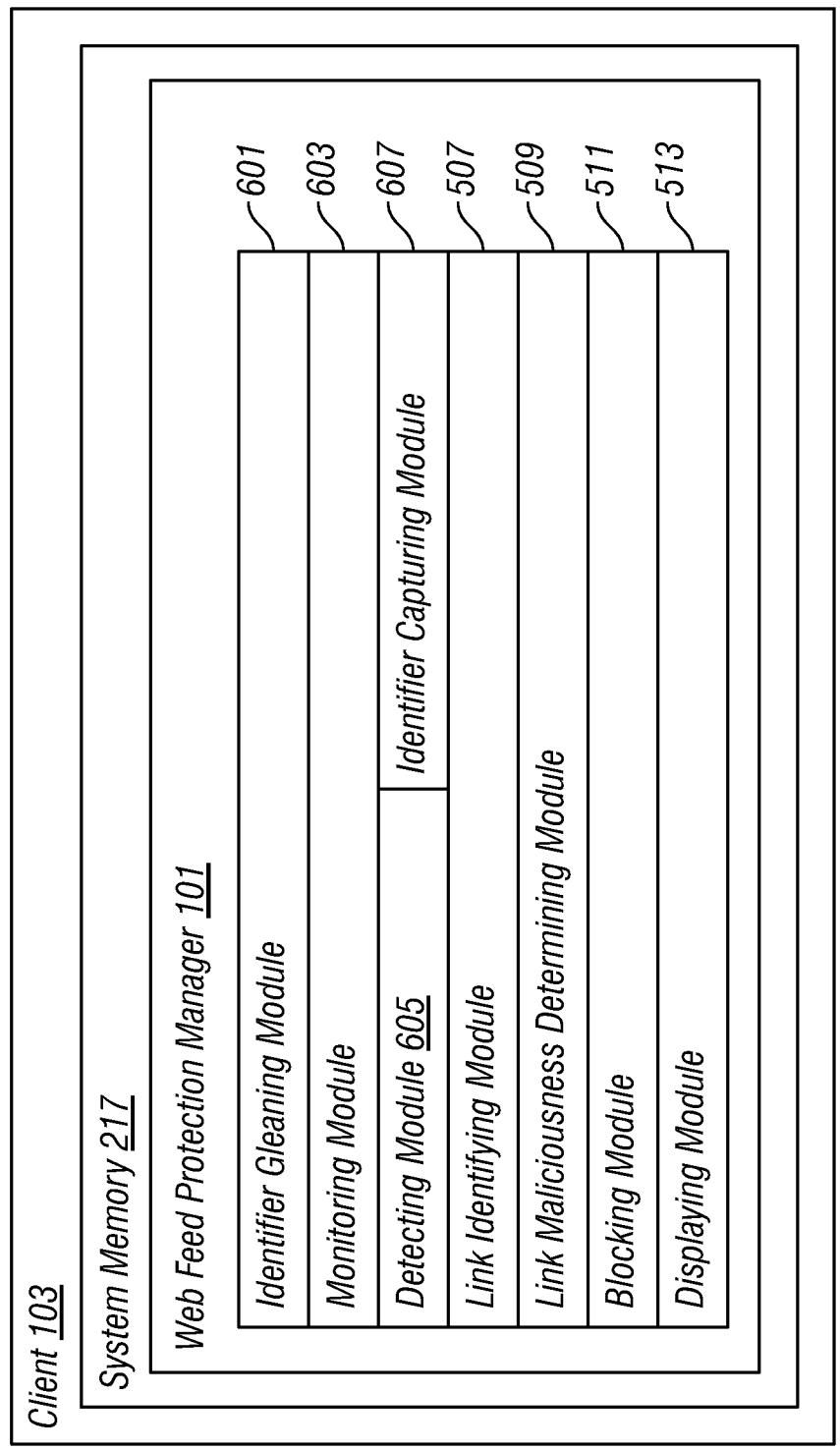
FIG. 7 is a block diagram of specific modules of a client-side web feed protection manager 101 according to some embodiments.

FIG. 7 illustrates specific modules of a client-side web feed protection manager 101 according to some embodiments. As with the client agent 109 described in conjunction with FIG. 6, an identifier gleaning module 601 gleans identifiers 313 of web feeds 303 to which a user 307 attempts to subscribe or otherwise flags as being of interest. A monitoring module 603 can monitor web feed activity, for example by monitoring the activity of a feed reader 315. A detecting module 605 detects attempts to subscribe to web feeds 303 and to obtain new web feed originated content 305. An identifier capturing module 607 can capture identifiers 313 of web feeds 303 targeted in monitored activities. As with the server 105 based web feed protection manager 101 described in conjunction with FIG. 5, a link identifying module 507 identifies links 301 in web feeds 303 and web feed content 305. A link maliciousness determining module 509 determines whether identified links 301 are potentially malicious. A blocking module 511 blocks web feeds 303 and content 305 determined to contain suspicious links 301, and a displaying module 513 displays web feeds 303 and content 305 adjudicated to contain only safe links 301.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for protecting subscribers of web feeds from malware attacks, the method comprising the steps of:
    gleaning, by a computer, identifiers of web feeds from which a user indicates an interest in obtaining content;
    identifying links in web feeds corresponding to gleaned identifiers;
    determining whether identified links in web feeds corresponding to gleaned identifiers are safe for the user to access;
    displaying web feeds to the user only in response to determining that all links identified in the web feeds are safe for the user to access;
    detecting attempts by the user to obtain new content from displayed web feeds;
    identifying links in the new content the user is attempting to obtain from displayed web feeds;
    determining whether identified links in the new content the user is attempting to obtain from displayed web feeds are safe for the user to access, wherein at least the identifying of links and the determining whether identified links are safe to access is performed by a server computer;
    displaying new content containing only safe links to the user;
    blocking new content containing at least one suspicious link; and
    substituting replacement identifiers for actual identifiers of web feeds in the attempts by the user to obtain the new content from displayed web feeds, wherein each substitute identifier invokes the server computer to identify links in the new content from a corresponding web feed and to determining whether identified links in the new content are safe for the user to access.

2. The method of claim 1 wherein gleaning identifiers of web feeds from which a user indicates an interest in obtaining content further comprises:
    monitoring the user's web feed activity;
    detecting attempts by the user to subscribe to web feeds; and
    capturing identifiers of web feeds to which the user attempts to subscribe.

3. The method of claim 1 wherein gleaning identifiers of web feeds from which a user indicates an interest in obtaining content further comprises:
    receiving user entered identifiers of web feeds.

4. The method of claim 1 wherein identifying links in web feeds corresponding to gleaned identifiers further comprises:
    examining a channel element of a web feed to detect links.

5. The method of claim 1 wherein identifying links in new content from a displayed web feed further comprises:
    examining item elements of a web to detect links.

6. The method of claim 1 wherein determining whether an identified link is safe for the user to access further comprises:
    obtaining a safety rating for a link from a remote, centralized security source.

7. The method of claim 1 further comprising:
    displaying a warning to the user concerning blocked content containing at least one suspicious link.

8. At least one non-transitory computer readable-storage medium for protecting subscribers of web feeds from malware attacks, the at least one non-transitory computer readable-storage medium storing computer executable instructions that, when loaded into computer memory and executed by at least one processor of a computing device, cause the computing device to perform the following steps:
    gleaning, by a computer, identifiers of web feeds from which a user indicates an interest in obtaining content;
    identifying links in web feeds corresponding to gleaned identifiers;
    determining whether identified links in web feeds corresponding to gleaned identifiers are safe for the user to access;
    displaying web feeds to the user only in response to determining that all links identified in the web feeds are safe for the user to access;
    detecting attempts by the user to obtain new content from displayed web feeds;
    identifying links in the new content the user is attempting to obtain from displayed web feeds;
    determining whether identified links in the new content the user is attempting to obtain from displayed web feeds are safe for the user to access, wherein at least the identifying of links and the determining whether identified links are safe to access is performed by a server computer;
    displaying new content containing only safe links to the user;
    blocking new content containing at least one suspicious link; and
    substituting replacement identifiers for actual identifiers of web feeds in the attempts by the user to obtain the new content from displayed web feeds, wherein each substitute identifier invokes the server computer to identify links in the new content from a corresponding web feed and to determining whether identified links in the new content are safe for the user to access.

9. The at least one non-transitory computer readable-storage medium of claim 8 further storing computer executable instructions to perform the following additional steps:
    monitoring the user's web feed activity;
    detecting attempts by the user to subscribe to web feeds; and
    capturing identifiers of web feeds to which the user attempts to subscribe.

10. The at least one non-transitory computer readable-storage medium of claim 8 further storing computer executable instructions to perform the following additional step:
- receiving user entered identifiers of web feeds.

11. The at least one non-transitory computer readable-storage medium of claim 8 further storing computer executable instructions to perform the following additional step:
- examining a channel element of a web feed to detect links.

12. The at least one non-transitory computer readable-storage medium of claim 8 further storing computer executable instructions to perform the following additional step:
- examining item elements of a web feed to detect links.

13. The at least one non-transitory computer readable-storage medium of claim 8 further storing computer executable instructions to perform the following additional step:
- obtaining a safety rating for the link from a remote, centralized security source.

14. The at least one non-transitory computer readable-storage medium of claim 8 further storing computer executable instructions to perform the following additional step:
- displaying a warning to the user concerning blocked content containing at least one suspicious link.

15. A computer system for protecting subscribers of web feeds from malware attacks, the computer system comprising:
- system memory;
- an identifier gleaning module residing in the system memory, the identifier gleaning module being programmed to glean identifiers of web feeds from which a user indicates an interest in obtaining content;
- a detecting module residing in the system memory, the detecting module being programmed to detect attempts by the user to obtain new content from displayed web feeds;
- a link identifying module residing in the system memory, the link identifying module being programmed to identify links in web feeds corresponding to gleaned identifiers and in the new content the user is attempting to obtain from displayed web feeds;
- a link maliciousness determining module residing in the system memory, the link maliciousness determining module being programmed to determine whether identified links in the new content the user is attempting to obtain from displayed web feeds are safe for the user to access, wherein at least the identifying of links and the determining whether identified links are safe to access is performed by a server computer, wherein the link maliciousness determining module is further programmed to substitute replacement identifiers for actual identifiers of web feeds in the attempts by the user to obtain the new content from displayed web feeds, and wherein each substitute identifier invokes the server computer to identify links in the new content from a corresponding web feed and to determining whether identified links in the new content are safe for the user to access;
- a displaying module residing in the system memory, the displaying module being programmed to display web feeds to the user only in response to determining that all links identified in the web feeds are safe for the user to access, and to display new content containing only safe links to the user; and
- a blocking module residing in the system memory, the blocking module being programmed to block new content containing at least one suspicious link.

16. The computer system of claim 15 further comprising:
- a monitoring module residing in the system memory, the monitoring module being programmed to monitor the user's web feed activity; and
- an identifier capturing module residing in the system memory, the identifier capturing module being programmed to capture identifiers of web feeds to which the user attempts to subscribe; wherein
- the detecting module is further programmed to detect attempts by the user to subscribe to web feeds.

* * * * *